United States Patent Office 3,387,928
Patented June 11, 1968

3,387,928
RECOVERY OF TELLURIUM AND/OR SELENIUM FROM AQUEOUS SOLUTIONS
Arthur C. Doumas, Lake Jackson, Tex., assignor to The Dow Chemical Company, Midland, Mich., a corporation of Delaware
No Drawing. Filed Apr. 8, 1965, Ser. No. 446,735
9 Claims. (Cl. 23—139)

The invention relates to the recovery of tellurium or selenium values from tellurium- or selenium-containing ore concentrates and solutions containing tellurium or selenium compounds dissolved therein. For purposes of convenience, tellurium, in its generic and broad sense, will be usually referred to hereinafter by the chemical symbol Te and selenium by its chemical symbol Se.

Te ore concentrates consist essentially of tellurium oxides and Se ore concentrates consist essentially of selenium oxides intermixed with other metal compounds. Difficulty has been encountered in separating the Te and Se values from other metals present.

The descriptive material hereinafter refers largely to Te recovery. However, it will be apparent after studying the description and the examples, that Se values may be recovered similarly to Te values by the practice of the invention.

It is known to use a mineral acid to leach metal values out of ores. In general, only acids of high concentration are fully satisfactory for this purpose because such acids leach out more metal per volume of acid used.

Attempts have been made to recover tellurium values from aqueous acidic leach solutions by admixing therewith methylisobutyl ketone or tri-n-butyl phosphate to effectuate a separation into phases and thereafter recovering one phase containing a higher proportion of tellurium than the other phase.

However, such attempts have been unsatisfactory. For example, when using either of these materials in aqueous hydrochloric acid as the leach solution, the concentration cannot be over about 20% by weight HCl, or two phases do not form to a sufficient extent for the procedure to be acceptable. As a further example, when these materials are used with aqueous phosphoric acid as the leach solution, the pH value cannot be greater than about 2.0 to result in an acceptable extraction and phase separation.

The use of any organic additives, heretofore attempted for the recovery of Te values from aqueous acidic solutions has found no practical use except in analytical methods wherein the use of large amounts of weak acids as the leach liquid with relatively small amounts of ore is acceptable. Such analytical methods are not economically feasible in large scale leaching and extraction operations.

The invention provides a method of extracting Te values from highly concentrated acidic solutions to obtain high percentage recoveries of the Te.

It comprises admixing an hydroxyethyl alkyl ether, wherein the alkyl contains from 5 to 10 carbon atoms per molecule, with an aqueous acidic solution of Te-bearing material dissolved in either aqueous hydrochloric acid or aqueous phosphoric acid; allowing the so treated material to stand and to separate into an upper organic phase containing a preponderance of the Te values and a lower aqueous phase; and separating the phases. The acid is an aqueous solution which should preferably be of high concentration (i.e. that giving a pH of 2 or less) but is operable over the range of from about pH 6 to the saturation point of the acid. Concentrations giving a pH value of not greater than 0.5 are preferred. The temperature employed may be anywhere between the freezing point of the Te-containing aqueous acid solution and the boiling point thereof, room temperature being quite satisfactory. No critical pressure conditions must be observed, atmospheric pressure usually being employed.

The ratio of the 2-hydroxyethyl alkyl ether employed to the Te-containing aqueous acidic solution being treated is not highly critical. Proportions of between about 10 and 1 of the ether to between about 1 and 10 of the aqueous acidic solution by volume are operable. Proportions of between about 4 and 1 of the ether to between about 1 and 4 by volume of the Te-containing aqueous acidic solutions are recommended, a proportion of between about 3 and 1 of the ether to 1 of the Te-containing solution commonly being used.

Selenium and iron, when present in the ore treated, are also extracted from the ore to some extent, and appear in the organic phase with the Te values. These may subsequently be separated by known means. For example, selenium may be separated as follows:

Acidify the organic solution containing tellurium values and also some selenium values with HCl to form a highly concentrated HCl solution. Pass gaseous $SO_2$ therethrough. The Se values are thereby reduced and caused to precipitate and may be subsequently readily removed, as by filtration.

U.S. Patent 2,349,697 sets forth a method of separating Se from an aqueous solution containing the same together with Te values.

The iron when present may be separated by known methods, e.g. according to the following procedure:

The ether phase obtained in accordance with the practice of the invention, containing Fe (Se may also be present) is acidified, e.g. with an aqueous solution of HCl, to a pH value of less than 7. An alkaline solution, e.g. an aqueous solution of NaOH, is then admixed therewith to raise the pH value thereof above 7. At a pH greater than 7, the Te values (and Se if present) go into solution but the Fe precipitates out as $Fe(OH)_3$ and can be separated as by filtration. The Te and Se are present in the filtrate as $TeO_2$ and $SeO_2$. The pH value of the filtrate is then lowered to about 5. At that pH, the $TeO_2$ precipitates out but the $SeO_2$ remains in solution. The $TeO_2$ solution can be separated as by filtration. The $TeO_2$ may then be recovered from the solution by lowering the pH to less than 5 wherein the $TeO_2$ precipitates and can be easily recovered, as by filtration. The Te metal then can be recovered from the $TeO_2$ by any one of a number of known procedures.

Examples, illustrative of the practice of the invention, were run. In these examples the 2-hydroxyethyl alkyl ether employed was 2-hydroxylethyl n-hexyl ether, for example, that obtained under the trademark of N-Hexyl Cellosolve. It has a specific gravity between 0.887 and 0.892 measured at 20° C., a boiling point of 200° C. and a freezing point of $-45.1°$ C. at standard pressure, and a viscosity of 5.15 centipoises measured at 20° C.

Example 1

25 milliliters of an aqueous solution of HCl having a pH value of about 2.7 and containing 0.15 weight percent of Te, dissolved therein as $TeO_2$, were placed in a separatory funnel. To the HCl solution containing the Te were then added 25 cc. of the above named ether. The funnel was then shaken and thereafter allowed to stand for about 1.5 hours, during which time an upper organic phase and a lower aqueous phase formed. The phases were then separated and both phases analyzed for tellurium content.

The following results were obtained.

| | Wt. percent Te |
|---|---|
| Aqueous layer | 0.03 |
| Organic layer | 0.10 |

The distribution coefficient, designated D, calculated according to the following formula:

$$D = \frac{\text{wt. percent Te in organic phase}}{\text{wt. percent Te in aqueous phase}}$$

was 3.33.

The results show a highly selective dissolution of the Te values in the 2-hydroxyethyl n-hexyl ether phase.

Example 2

50 milliliters of the aqueous HCl Te-containing solution employed in Example 1 were placed in a separatory funnel. 25 milliliters of the same type ether employed in Example 1 were admixed therewith and the so treated solution allowed to stand for about 1.5 hours. During this time aqueous and organic phases formed, were subsequently separated, and each analyzed for its tellurium content. The results are set out below.

|  | Wt. percent Te |
|---|---|
| Aqueous layer | 0.05 |
| Organic layer | 0.17 |

The distribution coefficient, D, found according to the formula set out above, was 3.4.

The results show substantially the same selective dissolution of the Te values in the organic phase as in Example 1.

Example 3

25 milliliters of an aqueous leach solution, obtained by dissolving $TeO_2$ in an HCl solution of about pH 1.0, containing 2.1 percent by weight Te, were placed in a separatory funnel. With this solution were admixed 25 milliliters of the same type ether employed in Examples 1 and 2. After standing about 1 hour and allowing to stand, two phases formed similarly to those in the above examples. These were separated and analyzed. The results are set out below.

|  | Wt. percent Te |
|---|---|
| Aqueous layer | 0.8 |
| Organic layer | 1.2 |

The D value obtained by dividing 1.2 by 0.8 was 1.5.

By repeating the separatory leachings with additional ether added to the aqueous phase, higher percentages of Te recovery may be attained.

Example 4

20.5 grams of Te metal were dissolved in 200 milliliters of a 20 percent by weight aqueous HCl solution. By analysis this was 8.5 percent by weight Te. 25 milliliters of the solution so made were placed in a separatory funnel. 25 milliliters of the ether employed in the above examples were then admixed therewith and the so treated solution allowed to stand for about one hour during which time it separated into two phases as in the examples above. The phases were separated and analyzed for Te values. The results of the analysis are set out below.

|  | Wt. percent Te |
|---|---|
| Aqueous layer | 2.0 |
| Organic layer | 5.8 |

$$D = \frac{5.8}{2.0} \text{ or } 2.9$$

These results show that high concentrations of Te may be effectively treated for recovery of the Te values according to the invention.

Example 5

For use in Example 5, a tellurium- and selenium-containing feed solution was prepared by digesting Te and Se metals in aqua regia and boiling to dryness. The residue was divided into three portions. One portion was dissolved in phosphoric acid, a second portion in nitric acid, and the third portion in sulfuric acid. The concentration of the acid anion group in each acid solution and the concentration of the tellurium and selenium present therein were determined and are set out in Table I. The mixing and analysis procedures followed for each acid solution were the same. The concentration of the acid anion group and the Te and Se present in the untreated aqueous solution are set out in Table I below.

TABLE I

| Acid Feed Solution | | | | Grams of Acid Anion group Present per Liter of Solution | | |
|---|---|---|---|---|---|---|
| Acid Employed | pH | Weight percent | | | | |
| | | Te | Se | $NO_3$ | $PO_4$ | $SO_4$ |
| $HNO_3$ | <1 | 0.53 | 0.047 | 101 | Nil | Nil |
| $H_2SO_4$ | <1 | 0.46 | 0.031 | 0.3 | Nil | 171 |
| $H_3PO_4$ | <1 | 0.29 | 0.030 | Nil | 308 | Nil |

25 milliliters of each of the three aqueous acid feed solutions having the above analysis were placed independently in three separatory funnels thereby making three sets of three samples each or a total of nine test samples. 25 milliliters of tri-n-butyl phosphate were added to one of the test samples of each of the sets of three unlike acid solutions; 25 cc. of methyl isobutyl ketone were added to a second of each of the three unlike acid solutions, and 25 cc. of 2-hydroxyethyl-n-hexyl ether were added to the third of each of the three different acid solutions. The procedure thereafter followed for each of the nine test samples consisted of shaking and allowing the mixture to stand.

There was some phase separation in $HNO_3$ and $H_2SO_4$ acid solution test samples but the interface was not marked and an effective separation could not be made. The samples of those acids containing the 2-hydroxyethyl-n-hexyl showed a somewhat better phase separation in the $HNO_3$ and $H_2SO_4$ than the other samples. The organic and aqueous phases were separated and analyzed for Te and Se values for each of the nine test samples. The distribution coefficient D was then calculated according to the formula $$D = \frac{\text{weight percent metal in organic phase}}{\text{weight percent metal in aqueous phase}}$$

In the tables below: methyl isobutyl ketone is designated MIBK; tri-n-butyl ketone is designated TBP; 2-hydroxyethyl-n-hexyl ether is designated HEHE.

The results of the $HNO_3$ acid tests are shown in Table II.

TABLE II.—$HNO_3$ ACID RESULTS

| Additive | Aqueous Phase, Wt. percent | | Organic Phase Wt. percent | | D Coefficient | |
|---|---|---|---|---|---|---|
| | Te | Se | Te | Se | Te | Se |
| MIBK | 0.54 | 0.044 | <0.0002 | [1] 50 | <0.037 | 0.113 |
| TBP | 0.47 | 0.045 | <0.0002 | [1] 23 | <0.0425 | 0.0511 |
| HEHE | 0.40 | 0.055 | 0.09 | 0.033 | 0.225 | 0.60 |

[1] P.p.m.

Reference to Table II shows that, although selective extraction occurs to some extent when the 2-hydroxyethyl-n-hexyl ether is admixed with the $HNO_3$ solution, $HNO_3$ is unsatisfactory as an acidic medium for separating Te values.

The results of the $H_2SO_4$ acid tests are set out in Table III below.

TABLE III.—$H_2SO_4$ ACID RESULTS

| Additive [1] | Aqueous Layer, Wt. percent | | Organic Layer, Wt. percent | | D Coefficient | |
|---|---|---|---|---|---|---|
| | Te | Se | Te | Se | Te | Se |
| MIBK | 0.46 | 0.039 | [2] <200 | [2] 75 | <0.0435 | 0.19 |
| HEHE | 0.36 | 0.032 | 0.06 | 0.028 | 0.0166 | 0.875 |

[1] The tributyl phosphate test was not completed.
[2] P.p.m.

The results of the H₃PO₄ acid tests are set out in Table IV.

TABLE IV.—H₃PO₄ ACID RESULTS

| Additive | Aqueous Layer, Wt. percent | | Organic Layer, Wt. percent | | D Coefficient | |
|---|---|---|---|---|---|---|
| | Te | Se | Te | Se | Te | Se |
| MIBK | 0.28 | 0.065 | ¹<200 | 0.01 | <0.0714 | 0.1538 |
| TBP | 0.28 | 0.030 | ¹<200 | ¹60 | <0.0714 | 0.2 |
| HEHE | 0.04 | 0.025 | 0.35 | 0.3 | 8.75 | 1.20 |

¹ P.p.m.

Reference to Table IV shows that 2-hydroxyethylhexyl ether is highly selective as an extractant for Te in aqueous phosphoric acid solutions. As hereinbefore mentioned, if desired, the aqueous solution of H₃PO₄, containing some Te values, may be treated successively with additional amounts of the ether. The Se may be separated by known methods, e.g. as suggested hereinbefore.

Example 6

To show the practice of the invention employing a hydrochloric acid solution containing Te values together with a number of other metals, 50 grams of TeO₂ ore concentrate containing such other metals were dispersed in 2 liters of 6 N hydrochloric acid. The dispersion was filtered and the resulting filtered solution analyzed for the metals for which the results are shown in Table V.

TABLE V.—METALS PRESENT IN UNTREATED AQUEOUS SOLUTION

| | Parts per million | | | | | | | | | | Weight percent Te |
|---|---|---|---|---|---|---|---|---|---|---|---|
| | Al | Cu | Fe | Ag | Bi | Si | Pb | Zn | Ca | Mn | |
| Analysis (wt. basis) | 40 | 6 | 350 | 1.5 | 15 | 5 | 50 | 16 | 28 | 110 | 1.0 |

50 milliliters of the solution so prepared were put in a separatory funnel and 25 milliliters of 2-hydroxy-n-hexyl ether admixed therewith. The contents were allowed to stand for about 1 hour during which a superimposed organic layer over an aqueous layer formed.

Both layers or phases were analyzed and the distribution coefficient (D) was calculated for the metals shown in Table VI below.

TABLE VI.—D COEFFICIENTS

Al=0.317     Pb=0.163
Cu=0.15      Zn=1.0
Fe=19.5      Ca=0.344
Ag=0.06      Mn=0.358
Bi=0.655     Te=15.9
Si=0.356

Reference to Table VI shows that a high distribution coefficient was obtained for Te and an excellent separation of Te effectuated from all metals except Fe. The Te and Fe may be subsequently separated by any of the methods known to those skilled in the art, e.g. that set out hereinfore.

For comparative purposes, Example 6 was repeated except that 25 milliliters of methyl isobutyl ketone was employed instead of 25 milliliters of 2-hydroxyethyl-n-hexyl ether. No phase separation of this ore could be attained. Since only one phase formed, no recovery of metal values was possible.

Example 6 was again repeated except that, instead of employing 25 milliliters of 2-hydroyethyl-n-hexyl ether, 12.5 milliliters thereof were employed in admixture with 12.5 milliliters of methyl isobutyl ketone to evaluate the effect of such mixture. Phase separation did occur, the phases analyzed, and the distribution coefficient calculated for the metals set out in Table VII.

TABLE VII.—D COEFFICIENTS

Al=0.394     Si=1.04
Cu=0.333     Pb=0.95
Fe=12.37     Ca=0.47
Ag=1.0       Mn=0.31
Bi=0.86      Te=4.42

Reference to Table VII shows that the methyl isobutyl ketone not only failed to effectuate selective dissolution of the Te values, but detracted from the final separation since the Te recovered was only 4.42/15.9 or less than 30% of that recovered according to the invention employing 25 milliliters of 2-hydroxyethyl-n-hexyl ether.

However, if preferred, the above extraction of Te values employing a mixture of 2-hydroxyethyl-n-hexyl ether and another organic solvent of the nature of methyl isobutyl ketone may be employed if a lower recovery of the Te values is acceptable. It can be seen that the order of removal of the metal analyzed, although clearly of less efficacy is similar to that when the organic solvent substantially is all 2-hydroxyethyl-n-hexyl ether.

Where found convenient or economical to dilute the 2-hydroxyalkyl-n-alkyl ether with such substantially inert organic water-immiscible liquids as kerosene, such may be done without preventing attainment of the objectives. In some instances the presence of a hydrocarbon liquid of the nature of kerosene aids in defining a sharper interface between the phases.

An aqueous solution of a mixture of hydrochloric and phosphoric acids as the acid solvent for Te and/or Se in the practice of the invention is a very effective embodiment thereof.

Comparable results may be obtained when employing other 2-hydroxyethyl normal alkyl ethers, wherein the alkyl group is heptyl, octyl, nonyl, or decyl instead of hexyl. The invention may be practiced employing 2-hydroxy-ethyl-n-pentyl ether, but the monoethers containing one of the longer alkyl groups named are preferred since the pentyl group tends to show some miscibility with the aqueous phase.

The examples show that either Te or Se values may be recovered in accordance with the practice of the invention, either in the presence of the other or in the absence thereof.

Having described my invention, what I claim and desire to protect by Letters Patent is:

1. The method of recovering metal values selected from the class consisting of tellurium-containing material, selenium-containing material, and mixtures thereof which comprises preparing an acidic solution of said material by dissolving it in an aqueous acid selected from the class consisting of hydrochloric, phosphoric, and mixtures thereof to make an aqueous acidic solution of said material having a pH value of 6 or less; admixing with the solution so made a 2-hydroxyethyl-n-alkyl ether, having from 5 to about 10 carbon atoms in the alkyl, in an amount sufficient to provide proportions by volume of between from about 10 to 1 of the metal-containing acidic solution and from about 1 to 10 of the 2-hydroxyethyl-n-alkyl ether; allowing the resulting solution to stand to effectuate a separation into an upper organic phase containing a preponderance of the tellurium and selenium values and a lower aqueous phase; and separating the two phases.

2. The method according to claim 1 wherein the 2-hydroxyethyl-n-alkyl ether is 2-hydroxyethyl-n-hexyl ether.

3. The method according to claim 1 wherein the proportions of the aqueous acidic solution containing said metal values and the 2-hydroxyethyl-n-alkyl ether is from about 3 to 1 of the acidic solution to 1 of the ether.

4. The method according to claim 1 wherein the acid employed is hydrochloric acid.

5. The method according to claim 1 wherein the acid employed is phosphoric acid.

6. The method according to claim 1 wherein the acid employed is a mixture of hydrochloric and phosphoric.

7. The method according to claim 1 wherein the pH value of the resulting acidic solution is less than about 0.5.

8. The method according to claim 1 wherein both selenium values and tellurium values are recovered in the organic phase and are subsequently separated from each other by passing $SO_2$ gas therethrough, while in solution, to reduce and precipitate the selenium values and subsequently separating the tellurium values from the precipitated selenium values.

9. The method according to claim 1 wherein some iron is present with the recovered selenium values and tellurium values in the solution wherein each is subsequently separated from the others by acidifying the solution to a pH value of less than 7, alkalizing the solution to a pH value greater than 7 to precipitate the iron present; separating the precipitated iron from the Te in solution; lowering the pH of the Te-containing solution to about 5 to precipitate Se values; separating the precipitated Se values; lowering the pH of the solution containing the Te values to below 5 to precipitate the Te values, and recovering the thus precipitated Te values.

References Cited
UNITED STATES PATENTS

| | | | |
|---|---|---|---|
| 2,349,697 | 5/1944 | Bierly | 23—209 |
| 2,775,509 | 12/1956 | Lebedeff et al. | 23—139 |
| 3,158,443 | 11/1964 | Champ | 23—209 |

OSCAR R. VERTIZ, *Primary Examiner.*

HERBERT T. CARTER, *Examiner.*